US007418263B2

(12) United States Patent
Dutta et al.

(10) Patent No.: US 7,418,263 B2
(45) Date of Patent: *Aug. 26, 2008

(54) SYSTEMS AND METHODS FOR HANDOVER BETWEEN SPACE BASED AND TERRESTRIAL RADIOTERMINAL COMMUNICATIONS

(75) Inventors: Santanu Dutta, Cary, NC (US); Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 442 days.

This patent is subject to a terminal disclaimer.

(21) Appl. No.: 11/095,007

(22) Filed: Mar. 31, 2005

(65) Prior Publication Data

US 2005/0170834 A1 Aug. 4, 2005

Related U.S. Application Data

(63) Continuation of application No. 10/828,378, filed on Apr. 20, 2004, now Pat. No. 6,879,829.

(60) Provisional application No. 60/470,992, filed on May 16, 2003.

(51) Int. Cl.
*H04Q 7/20* (2006.01)

(52) U.S. Cl. .................. 455/436; 455/422; 455/426; 455/432.1; 455/436; 455/430

(58) Field of Classification Search .................. 455/422, 455/426–430, 432.1, 436
See application file for complete search history.

(56) References Cited

U.S. PATENT DOCUMENTS 4,901,307 A 2/1990 Gilhousen et al.

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—George Eng
*Assistant Examiner*—Emem Stephen
(74) *Attorney, Agent, or Firm*—Myers Bigel Sibley & Sajovec, P.A.

(57) ABSTRACT

A satellite communications system includes a satellite that is configured to wirelessly communicate with radioterminals in a satellite coverage area over a satellite frequency band, and an ancillary terrestrial component that is configured to wirelessly communicate with radioterminals in the satellite coverage area over at least some of the satellite frequency band, to thereby terrestrially reuse at least some of the satellite frequency band. Wireless communications with a radioterminal are handed over from the ancillary terrestrial component to the satellite if the radioterminal transmit power exceeds a threshold, and a received satellite signal quality exceeds a threshold, even though the radioterminal is able to wirelessly communicate with the ancillary terrestrial component. Downlink wireless radiation that is received at the radioterminal from a satellite may be monitored to determine potential interference created by the uplink radiation of the radioterminal due to the terrestrial reuse of at least some of the satellite frequency band.

33 Claims, 4 Drawing Sheets

U.S. PATENT DOCUMENTS

| | | |
|---|---|---|
| 5,073,900 A | 12/1991 | Mallinckrodt |
| 5,301,967 A | 4/1994 | Sparber |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,233,456 B1 | 5/2001 | Schiff et al. |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,260,994 B1 | 7/2001 | Matsumoto et al. |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 * | 4/2005 | Dutta et al. ................ 455/436 |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 2002/0041575 A1 | 4/2002 | Karabinis et al. |
| 2002/0090942 A1 | 7/2002 | Karabinis et al. |
| 2002/0122408 A1 | 9/2002 | Mullns |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054760 A1 | 3/2003 | Karabinis |
| 2003/0054761 A1 | 3/2003 | Karabinis |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0143949 A1 | 7/2003 | Karabinis |
| 2003/0149986 A1 | 8/2003 | Mayfield et al. |
| 2003/0153267 A1 | 8/2003 | Karabinis |
| 2003/0153308 A1 | 8/2003 | Karabinis |
| 2003/0224785 A1 | 12/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinia et al. |
| 2005/0282542 A1 | 12/2005 | Karabinis |
| 2005/0288011 A1 | 12/2005 | Dutta |
| 2006/0040659 A1 | 2/2006 | Karabinis |

FOREIGN PATENT DOCUMENTS

| | | | |
|---|---|---|---|
| EP | 0 597 225 | A1 | 5/1994 |
| EP | 0 506 255 | B1 | 11/1996 |
| EP | 0 748 065 | A2 | 12/1996 |
| EP | 0 755 163 | A2 | 1/1997 |
| EP | 0 762 669 | A2 | 3/1997 |
| EP | 0 762 669 | A3 | 3/1997 |
| EP | 0 797 319 | A2 | 9/1997 |
| EP | 0 831 599 | A2 | 3/1998 |
| EP | 0 831 599 | A3 | 3/1998 |
| EP | 1 059 826 | A1 | 12/2000 |
| EP | 1 193 989 | A1 | 4/2002 |

WO WO 01/54314 A1 7/2001

OTHER PUBLICATIONS

Ayyagari et al., "A satellite-augmented cellular network concept", *Wireless Networks*, Vo. 4, 1998, pp. 189-198.

Report and Order and Notice of Proposed Rulemaking, FCC 03-15, *Flexibility for Delivery of Communications by Mobile Satellite Service Providers in the 2 GHz Band, the L-Band, and the 1.6/2.4 Bands*, IB Docket No. 01-185, Adopted: Jan. 29, 2003, Released: Feb. 10, 2003.

Notification of Transmittal of The International Search Report and the Written Opinion of the International Searching Authority, of the Declaration, International Search Report, and Written Opinion of the International Searching Authority, PCT/US04/14992, Dec. 17, 2004.

* cited by examiner

SYSTEMS AND METHODS FOR HANDOVER BETWEEN SPACE BASED AND TERRESTRIAL RADIOTERMINAL COMMUNICATIONS

CROSS-REFERENCE TO RELATED APPLICATIONS

This application is a continuation of application Ser. No. 10/828,378, filed Apr. 20, 2004, now U.S. Pat. No. 6,879,829 entitled *Systems and Methods for Handover Between Space Based and Terrestrial Radioterminal Communications, and for Monitoring Terrestrially Reused Satellite Frequencies at a Radioterminal to Reduce Potential Interference*, and claims the benefit of provisional Application No. 60/470,992, filed May 16, 2003, entitled *Systems and Methods for Handover Between Space Based and Terrestrial Radioterminal Communications, and for Monitoring Terrestrially Reused Satellite Frequencies at a Radioterminal to Reduce Potential Interference*, the disclosures of both of which are hereby incorporated herein by reference in their entirety as if set forth fully herein.

FIELD OF THE INVENTION

This invention relates to radioterminal communications systems and methods, and more particularly to terrestrial cellular and satellite cellular radioterminal communications systems and methods.

BACKGROUND OF THE INVENTION

Satellite radioterminal communications systems and methods can terrestrially reuse satellite frequencies in an ancillary terrestrial network. Such systems and methods are described, for example, in published U.S. patent application 2003/0073436 A1 to Karabinis et al., entitled *Additional Systems and Methods for Monitoring Terrestrially Reused Satellite Frequencies to Reduce Potential Interference*, published Apr. 17, 2003, the disclosure of which is hereby incorporated herein by reference in its entirety as if set forth fully herein. As described in this published patent application, a satellite radioterminal system includes a space based component such as a satellite and an Ancillary Terrestrial Network (ATN) that includes a plurality of Ancillary Terrestrial Components (ATC). The space based component is configured to wirelessly communicate with radioterminals, also referred to as "radiotelephones", in a satellite footprint over a satellite radioterminal frequency band. The ancillary terrestrial network is configured to wirelessly communicate with radioterminals in the satellite footprint over at least some of the satellite radioterminal frequency band, to thereby terrestrially reuse at least some of the satellite radioterminal frequency band.

Satellite radioterminal communications systems and methods that may employ terrestrial reuse of satellite frequencies are also described in U.S. Pat. No. 6,684,057 to Karabinis, entitled *Systems and Methods for Terrestrial Reuse of Cellular Satellite Frequency Spectrum*; and Published U.S. patent application Ser. No. US 2003/0054760 to Karabinis, entitled *Systems and Methods for Terrestrial Reuse of Cellular Satellite Frequency Spectrum*; US 2003/0054761 to Karabinis, entitled *Spatial Guardbands for Terrestrial Reuse of satellite Frequencies*; US 2003/0054814 to Karabinis et al., entitled *Systems and Methods for Monitoring Terrestrially Reused Satellite Frequencies to Reduce Potential Interference*; US 2003/0054762 to Karabinis, entitled *Multi-Band/Multi-Mode Satellite Radiotelephone Communications Systems and Methods*; US 2003/0153267 to Karabinis, entitled *Wireless Communications Systems and Methods Using Satellite-Linked Remote Terminal Interface Subsystems*; US 2003/0224785 to Karabinis, entitled *Systems and Methods for Reducing Satellite Feeder Link Bandwidth/Carriers In Cellular Satellite Systems*; US 2002/0041575 to Karabinis et al., entitled *Coordinated Satellite-Terrestrial Frequency Reuse*; US 2002/0090942 to Karabinis et al., entitled *Integrated or Autonomous System and Method of Satellite-Terrestrial Frequency Reuse Using Signal Attenuation and/or Blockage, Dynamic Assignment of Frequencies and/or Hysteresis*; US 2003/0068978 to Karabinis et al., entitled *Space-Based Network Architectures for Satellite Radiotelephone Systems*; US 2003/0143949 to Karabinis, entitled *Filters for Combined Radiotelephone/GPS Terminals*; US 2003/0153308 to Karabinis, entitled *Staggered Sectorization for Terrestrial Reuse of Satellite Frequencies*; and US 2003/0054815 to Karabinis, entitled *Methods and Systems for Modifying Satellite Antenna Cell Patterns In Response to Terrestrial Reuse of Satellite Frequencies*, all of which are assigned to the assignee of the present invention, the disclosures of all of which are hereby incorporated herein by reference in their entirety as if set forth fully herein.

Terrestrial reuse of satellite frequencies has recently been authorized by the Federal Communications Commission (FCC). See, REPORT AND ORDER AND NOTICE OF PROPOSED RULEMAKING, FCC 03-15, *Flexibility for Delivery of Communications by Mobile Satellite Service Providers* in the 2 GHz Band, the L-Band, and the 1.6/2.4 Bands, IB Docket No.01-185, Adopted: Jan. 29, 2003, Released: Feb. 10, 2003, hereinafter referred to as the "FCC Order". The FCC Order specified that the L-band ATC shall maintain 18 dB of link margin at the edges of its service region in order to achieve in-building penetration and also to suppress radioterminal Effective Isotropic Radiated Power (EIRP), using closed-loop power control, when the radioterminal is radiating outside of signal attenuating structures.

Conventional uplink power control techniques can reduce a radioterminal's EIRP to significantly below a maximum, when a radioterminal is communicating with an ATC in an area of low signal attenuation (i.e., outside of a building). Thus, the potential for interference to satellite systems that may use the same frequencies as the ATC can be reduced or minimized. Moreover, when the radioterminal is inside of a signal attenuating structure such as a building, conventional uplink power control techniques may allow the uplink transmit power to increase and even attain a maximum, so as to overcome the additional penetration loss of the signal attenuating structure. This can be acceptable in terms of interference to co-channel satellites since, by definition, the signal attenuating structure in conjunction with closed-loop power control can ensure, relative to the co-channel satellite system, a level of interference signal suppression approximately equal to the return link (uplink) margin provided by the ATC (e.g., 18 dB).

SUMMARY OF THE INVENTION

Some embodiments of the present invention provide methods and systems for handing over wireless communications in a satellite communications system. The satellite communications system includes a satellite that is configured to wirelessly communicate with radioterminals in a satellite coverage area over a satellite frequency band, and an ancillary terrestrial component that is configured to wirelessly communicate with radioterminals in the satellite coverage area over at least some of the satellite frequency band, to thereby terrestrially reuse at least some of the satellite frequency band. Handover systems and methods according to some embodiments of the present invention hand over wireless communications with a radioterminal from the ancillary terrestrial component to the satellite if the radioterminal transmit power exceeds a threshold and a received satellite signal quality exceeds a threshold, even though the radioterminal is able to wirelessly communicate with the ancillary terrestrial component.

In other embodiments of the invention, wireless communications with the radioterminal are handed over from the ancillary terrestrial component to the satellite if the radioterminal transmit power exceeds a threshold, an aggregate radioterminal interference exceeds a limit, and the received satellite signal quality exceeds a threshold, even though the radioterminal is able to wirelessly communicate with the ancillary terrestrial component. In other embodiments of the present invention, wireless communications with the radioterminal are handed over from the ancillary terrestrial component to the satellite if the radioterminal transmit power exceeds a threshold, the received satellite signal quality exceeds a threshold, and the radioterminal is a predetermined distance away from the ancillary terrestrial component (such as a fixed distance or a percentage of the ancillary terrestrial component coverage area), even though the radioterminal is able to wirelessly communicate with the ancillary terrestrial component.

In still other embodiments of the present invention, wireless communications with the radioterminal are handed over from the ancillary terrestrial component to the satellite if the radioterminal transmit power exceeds a threshold, an aggregate radioterminal interference exceeds a limit, the received satellite signal quality exceeds a threshold, and the radioterminal is a predetermined distance away from the ancillary terrestrial component, even though the radioterminal is able to wirelessly communicate with the ancillary terrestrial component. In still other embodiments, wireless communications with the radioterminal are handed over from the ancillary terrestrial component to the satellite if the radioterminal transmit power exceeds a threshold, an aggregate radioterminal interference exceeds a limit, and the received satellite signal quality exceeds a threshold, independent of position of the radioterminal relative to the ancillary terrestrial component, even though the radioterminal is able to wirelessly communicate with the ancillary terrestrial component.

In still other embodiments of the present invention, the radioterminals are further configured to wirelessly communicate with a cellular/PCS base station in a cellular/PCS coverage area. In some of these embodiments, wireless communications with the radioterminal are handed over from the ancillary terrestrial component to the cellular/PCS base station if the radioterminal transmit power exceeds a threshold, a received satellite signal quality is below a threshold, and the radioterminal is at least a predetermined distance away from the ancillary terrestrial component, even though the radioterminal is able to wirelessly communicate with the ancillary terrestrial component. In still other embodiments, wireless communications with the radioterminal are handed over from the ancillary terrestrial component to the satellite or to the cellular/PCS base station if the radioterminal transmit power exceeds a threshold, a received satellite signal quality exceeds a threshold, and the radioterminal is at least a predetermined distance away from the ancillary terrestrial component, even though the radioterminal is able to wirelessly communicate with the ancillary terrestrial component.

In yet other embodiments, wireless communications with the radioterminal are handed over from the ancillary terrestrial component to the cellular/PCS base station if the radioterminal transmit power exceeds a threshold, a received satellite signal quality is below a threshold, an aggregate radioterminal interference exceeds a limit and the radioterminal is at least a predetermined distance away from the ancillary terrestrial component, even though the radioterminal is able to wirelessly communicate with the ancillary terrestrial component. In yet other embodiments, wireless communications with the radioterminal are handed over from the ancillary terrestrial component to the satellite or to the cellular/PCS base station if the radioterminal transmit power exceeds a threshold, a received satellite signal quality exceeds a threshold, an aggregate radioterminal interference exceeds a limit, and the radioterminal is at least a predetermined distance away from the ancillary terrestrial component, even though the radioterminal is able to wirelessly communicate with the ancillary terrestrial component.

As was described above, one of the criteria that may be used to govern handover is a determination whether the aggregate radioterminal interference exceeds a limit. In some embodiments of the present invention, a determination is made as to whether a radioterminal's interference exceeds a limit by monitoring downlink wireless radiation that is received at the radioterminal from a satellite, to thereby determine potential interference created by the uplink radiation of the radioterminal due to the terrestrial reuse of at least some of the satellite frequency band. Monitoring of potential interference may thereby be performed at the radioterminals themselves. In some embodiments, the power of a downlink wireless signal, such as a broadcast control channel that is received at the radioterminal from a satellite, is monitored, to thereby determine potential interference created by the uplink radiation of the radioterminal due to the terrestrial reuse of at least some of the satellite frequency band. It will also be understood that monitoring at the radioterminal may be used according to some embodiments of the present invention, independent of methods for handing over wireless communications in a satellite communications system, to thereby determine potential interference created by the uplink radiation of the radioterminal due to the terrestrial reuse of at least some of the satellite frequency band.

DETAILED DESCRIPTION

Figure 1:
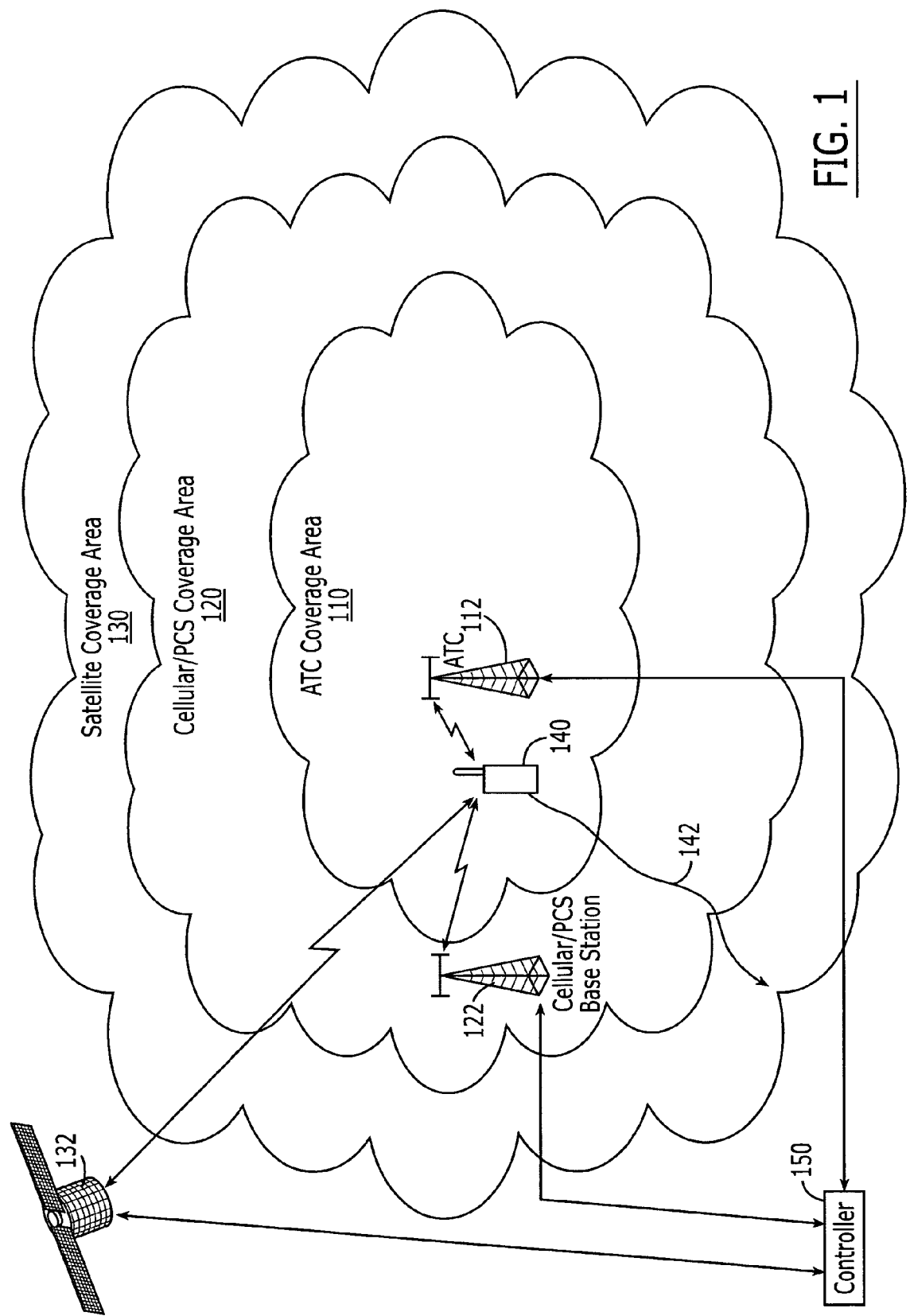
FIG. 1 is a schematic diagram of systems and methods for handing over wireless communications according to various embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items.

Some embodiments of the present invention may arise from a realization that, as a radioterminal moves to the edge and/or outside of the coverage area of an ATC, it may continue to receive signals from the ATC, even though the radioterminal is located near and/or outside the outer edge of an ATC coverage area. When the radioterminal moves to the edge and/or outside of the ATC coverage area, conventional power control may attempt to maintain communications link closure by increasing the radioterminal's power up to a maximum power, and may thus cause potentially increased interference to co-channel systems, such as co-channel satellite systems, when the radioterminal is communicating with a clear or substantially clear propagation path to such systems. Embodiments of the present invention can provide intelligent handover from the ATC mode to a non-ATC mode (such as cellular, and/or PCS, and/or satellite mode), to reduce the likelihood that power control methods may cause increased interference to co-channel systems.

Some embodiments of the present invention may also arise from realization that the interference potential of a radioterminal that radiates co-channel satellite-band frequencies may be measured at the radioterminal itself, by measuring one or more characteristics of a satellite downlink signal that is received at the radioterminal. These downlink measurements at individual radioterminals may be used to monitor a measure of the net return link (uplink) interference potential at a victim satellite by determining an aggregate power that is radiated by the ensemble of all active radioterminals at one or more satellite frequencies. Monitoring of aggregate interference can be used as part of a handover technique as described above, and/or for other purposes.

In the following description, systems and methods for intelligent handover from an ATC mode, to a non-ATC mode to reduce potential interference to co-channel systems, will first be described. Then, systems and methods for monitoring of interference potential via downlink measurements obtained by the radioterminal will be described. Finally, systems and methods for intelligent handover that incorporate monitoring at the radioterminal and/or at another part of the system, such as a satellite, will be described.

Handover Based Upon Radioterminal Transmit Power and Received Satellite Signal Quality Conventionally, uplink (return link) power control may be based on a combination of open- and/or closed-loop methods. In open loop power control, a radioterminal estimates a transmit power level, which may maintain a desired signal quality and/or strength at a base transceiver system (BTS) or base station, by monitoring its own received signal quality. In closed loop power control, the BTS advises the radioterminal of adjustments to the transmit power level (that may have initially been set by open loop power control). This form of power control (open- and/or closed-loop) may increase the radioterminal's EIRP up to a maximum in order to maintain link connectivity and/or acceptable link quality.

FIG. 1 is a schematic diagram of systems and methods according to some embodiments of the invention. As shown in FIG. 1, a radioterminal 140 communicates with an ATC 112, also referred to as an ATC base station, in an ATC coverage area 110 using a satellite frequency band. Outside the ATC coverage area 110, communications may be continued by cellular/PCS systems using terrestrial cellular/PCS frequency bands and/or a satellite 132 using a satellite frequency band. FIG. 1 shows a cellular/PCS coverage area 120 outside (as well as potentially inside) the ATC coverage area 110 and a satellite coverage area 130 outside (as well as potentially inside) the cellular/PCS and/or ATC coverage areas 120, 110, respectively. In other embodiments, the cellular/PCS coverage area 120 need not be present. FIG. 1 also illustrates a radioterminal 140 and a potential radioterminal path 142 from within the ATC coverage area 110 to outside the ATC coverage area 110. It will be understood that multiple satellites, coverage areas, ATCs, base stations and/or radioterminals may be provided.

Figure 2:
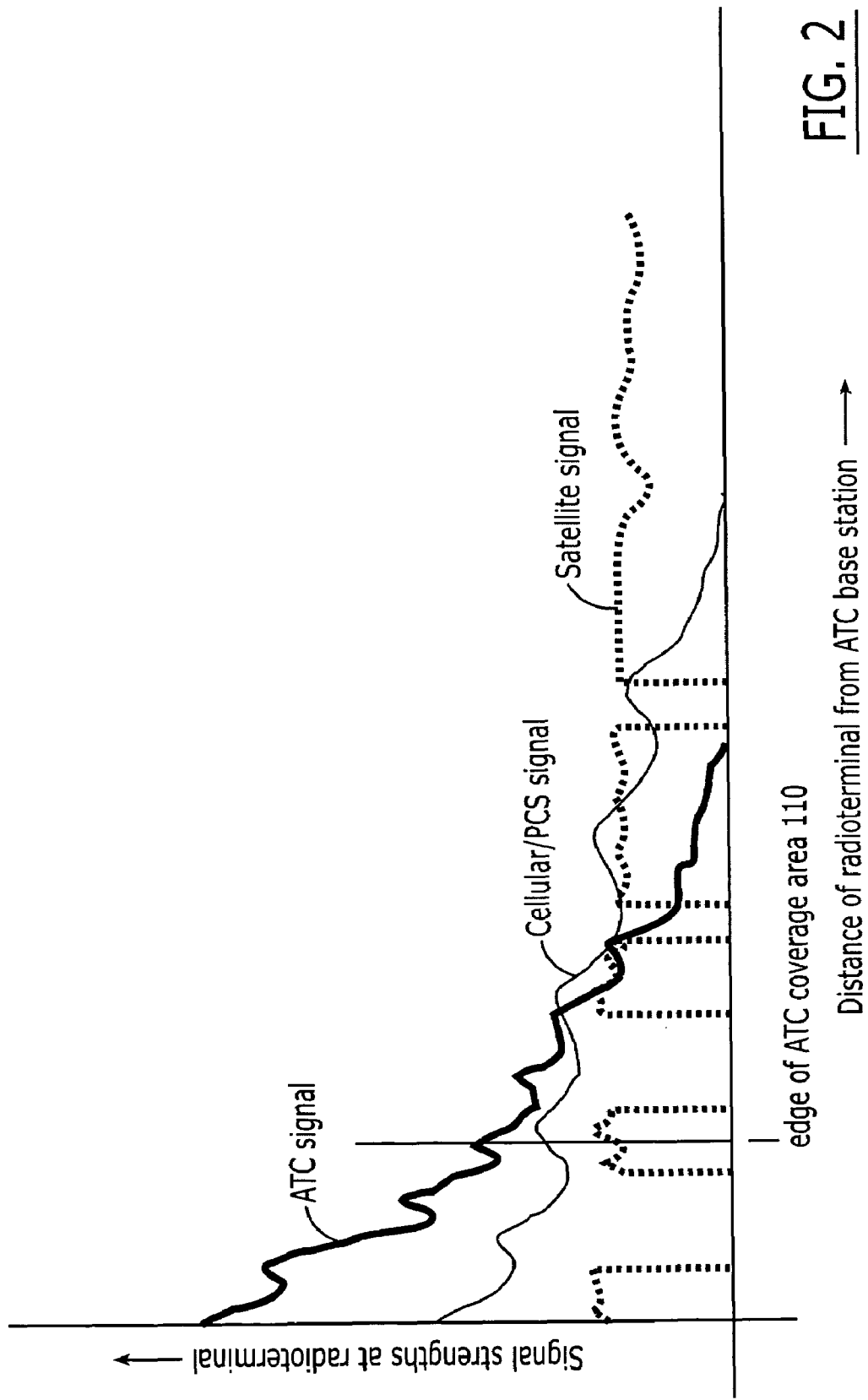
FIG. 2 graphically illustrates exemplary signal strengths received at multi-mode radioterminals according to various embodiments of the present invention.

FIG. 2 shows exemplary signal strengths from ATC, cellular/PCS and a satellite at a multi-mode (ATC/PCS/satellite) radioterminal 140 traveling from the ATC coverage area (ATC cell) 110, through the cellular/PCS coverage area 120, to the satellite coverage area 130, for example along the radioterminal path 142 shown in FIG. 1. The ATC signal may decay more rapidly, as a function of distance away from a serving ATC BTS 112, than cellular/PCS or satellite signals, owing to a high building density of the ATC environment (typical of inner city cores). The decay may not be monotonic owing to multipath and/or shadowing effects. The cellular/PCS signal strength may have a slower decay rate as a function of distance (away from a cellular/PCS base station 122) on the postulate of a less dense building density. The satellite signal may have a combination of Rician fading and blockage, in accordance with the well known Lutz propagation model. As shown in FIG. 2, inside the ATC coverage area 110, the percentage of time that the satellite signal is blocked may be greater than when the radioterminal is outside the ATC coverage area 110.

The radioterminal 140 may be configured to periodically monitor the signal qualities of its own and/or other alternative services, such as cellular/PCS and/or satellite, which are potential recipients of a service handover from the ATC 112. Many techniques for monitoring signal quality are known to those having skill in the art and need not be described in detail herein. Handover systems and methods according to embodiments of the invention may be based on the following recognition:

For a radioterminal 140 in ATC mode, IF uplink power control is attempting to set the radioterminal's transmit power, PTX, at a level greater than a first threshold, $PTX_{th}$, when a satellite received signal quality, SRQ, is above a second threshold, $SRQ_{th}$, THEN EITHER the radioterminal is outside the designated ATC coverage area, OR the radioterminal is inside the designated ATC coverage area and there is significant blockage to the ATC base station with a relatively clear line-of-sight propagation path to the satellite.

It will be recognized that the OR scenario may not happen very frequently in a dense urban area, because terrestrial propagation may generally not have a line of sight path to the ATC antenna. Nevertheless, this scenario may happen.

Figure 3:
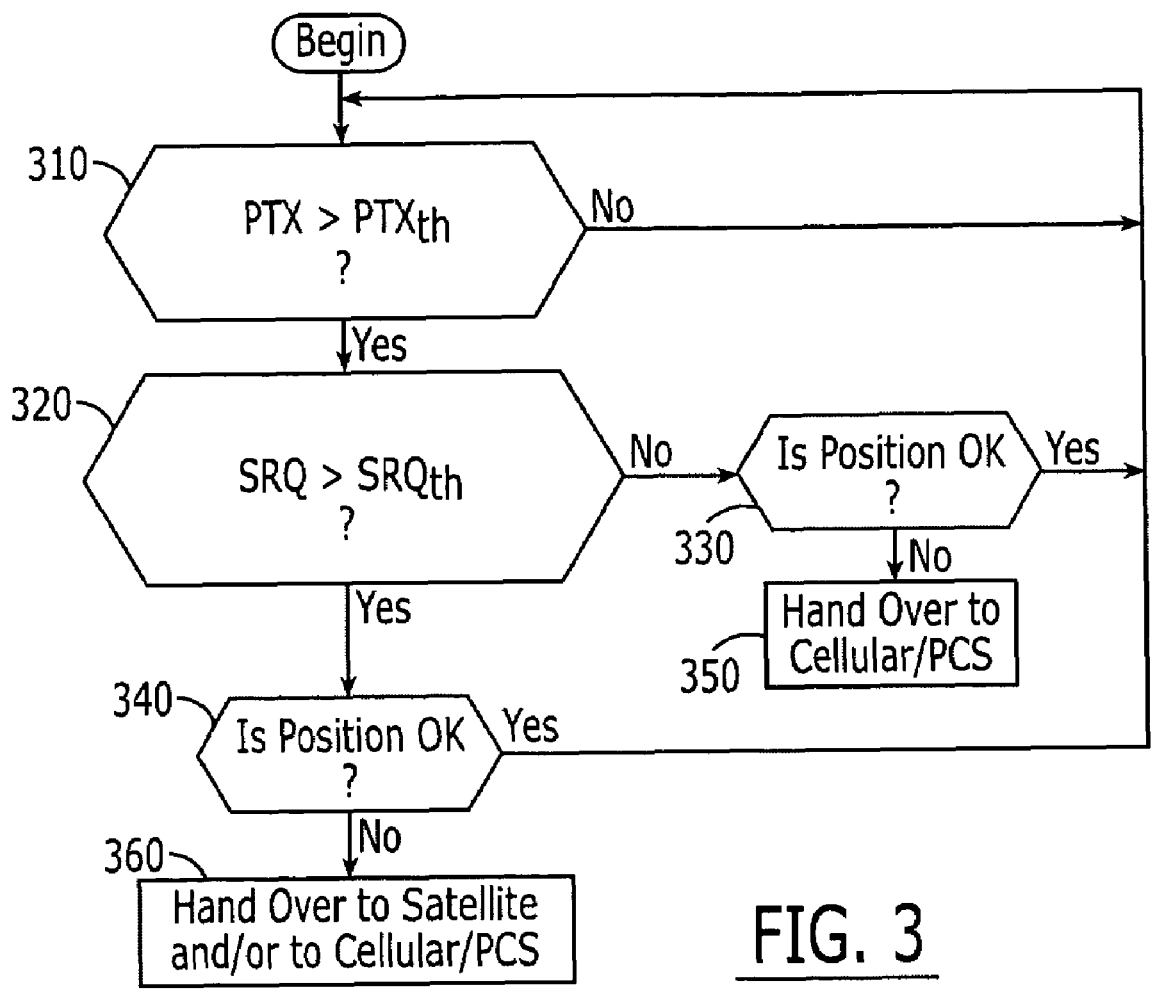
FIG. 3 is a flowchart of operations that may be performed to provide handover according to various embodiments of the present invention.

FIG. 3 illustrates handover operations in accordance with the above recognition, according to first embodiments of the present invention. These operations may be performed by a controller, such as the controller 150 of FIG. 1, which may be part of the satellite, ATC, cellular and/or PCS systems, or at least partially independent therefrom. In particular, as shown in FIG. 3, at Block 310, a test is made as to whether the radioterminal transmit power PTX exceeds a first threshold $PTX_{th}$. It will be understood that this first threshold may be constant or variable (based on one or more criteria). If the result of the test of Block 310 is No, handover need not be performed, because the radioterminal transmit power is less than the first threshold and interference may not be created at an unacceptable level. However, if the radioterminal transmit power exceeds the threshold, i.e. the result of the test of Block 310 is Yes, then at Block 320, a test is made as to whether a received satellite signal quality measure, SRQ, is greater than a second (constant or variable) threshold, $SRQ_{th}$. If not, then the radioterminal 140 is either inside a building within the ATC coverage area 110, in which case even a maximum radioterminal transmit power is acceptable, or the radioterminal 140 is near the edge of the ATC coverage area 110 and is trying to compensate by increasing the radioterminal transmit power. A test is therefore made at Block 330 as to the position of the radioterminal 140. As is well known, the determination of a position of the radioterminal 140 may be made using Global Positioning System (GPS) and/or non-GPS-based techniques. These tests can be made by the radioterminal 140 and/or by the communications system.

Thus, at Block 330, if the radioterminal 140 is within a predetermined distance from a serving ATC base station 112, such as a certain percentage of the coverage area or cell size, the answer to "Is position OK?" is Yes, and handover need not be performed. Handover need not be performed because the implication is that the radioterminal 140 is inside a building within the ATC coverage area 110, so that high power transmission may not create unacceptable levels of interference. In contrast, at Block 330, if the radioterminal 140 is outside the predetermined distance from the serving ATC base station 112, the answer to "Is position OK?" is No, and a handover is made to the cellular/PCS system at Block 350. Handover is made on the assumption that the radioterminal 140 is in the clear, near and/or outside the edge of the serving ATC cell 110 and is transmitting high power in an attempt to maintain link closure and/or link quality. At Block 350, handover is not made to the satellite system, because relatively low signal strength and/or quality is received from the satellite system based on the test of Block 320.

Continuing with the description of FIG. 3, at Block 340, if the received satellite signal quality measure is greater than the threshold at Block 320, a test is also made as to whether the radioterminal's position is OK. If the position is within a predetermined distance and/or percentage of cell size from the serving ATC BTS 112, then handover need not be made, because the radioterminal 140 is operating within the appropriate ATC service area. On the other hand, at Block 340, if the position is not OK because the radioterminal is at a greater than the predetermined distance from the serving ATC BTS 112, the implication is that the terminal is radiating high transmit power in an attempt to continue communications with the serving ATC. In this scenario, handover is performed to the satellite 132 or to the cellular/PCS system 122 at Block 360. Handover may be made to the satellite 132 because the satellite signal quality was acceptable at Block 320.

Accordingly, embodiments of FIG. 3 can hand over to a satellite or cellular/PCS system when the radioterminal is transmitting high power in an attempt to continue to communicate with a serving ATC at the fringes and/or outside of the ATC's coverage area, but need not hand over when the radioterminal is inside of an ATC service area and is transmitting high power due to building and/or other signal blockage.

Monitoring of Interference Potential Via Measurements Performed by the Radioterminal The above-cited published U.S. patent application Publication 2003/0073436 A1 describes many techniques for monitoring wireless radiation at the space based component or satellite, which is produced by the ancillary terrestrial network and/or the radioterminals, and adjusting the radiation by the ancillary terrestrial network and/or the radioterminals in response to the monitoring. Some embodiments of the invention, which now will be described, can monitor interference potential via measurements that are performed by an ensemble of radioterminals. In particular, according to some embodiments of the present invention, the power received by a radioterminal on a downlink (forward link) signal, from a system's own satellite, may be used as a measure of uplink interference that may be received by the system's own and/or other systems' satellite(s) from that radioterminal. Alternatively, or in combination, the radioterminal may also monitor a downlink (forward link) signal of a satellite other than its own.

In particular, each radioterminal that is communicating in ATC mode may periodically report to the system the received signal power of the own-satellite broadcast control channel (e.g. S-BCCH in GMR-2) as detected by the radioterminal in the serving satellite spot-beam. The serving satellite spot-beam is the spot-beam serving the location where the radioterminal is situated. As a normal part of maintaining handover readiness, the radioterminal may also periodically be monitoring the signal strength/quality of neighboring terrestrial cells (both of the ATC and/or cellular/PCS) as well as of the serving satellite spot-beam, and potentially, the signal strength/quality of neighboring satellite spot beams.

The broadcast control channel(s) of the system's own satellite may be radiated at a fixed power level, without being subject to power control. This is true of the BCCH in GSM and S-BCCH in GMR-2. Knowledge of this power level, conventionally available to the satellite system operator, together with the corresponding received power level at the radioterminal (conventionally reported to the network control center) may be used to derive an uplink received power at both the system's own satellite and at any other satellite. The mathematical relationships are presented below based on the following definitions:

$P_B$: Transmit power of own satellite for forward link control channel (fixed power, known a priori).

$G_{DL\_os}$: Satellite antenna gain: downlink, own satellite, applied to control channel (fixed parameter, known a priori). The variation of the serving spot-beam antenna gain over the ATC region may be small and may be ignored.

$L_{DL\_os}$: Propagation path loss to radioterminal: downlink, own satellite (unknown parameter).

$L_{UL\_os}$: Propagation path loss from radioterminal: uplink, own satellite (unknown parameter).

$F_{os}$: Frequency dependent adjustment to downlink path-loss to obtain uplink path-loss in clear line of sight conditions (known a priori). In multipath conditions, the uplink and downlink losses will also have an additional time dispersion dependent component. Here it is assumed that, on an ensemble average basis, this difference is zero.

$L_{UL\_vs}$: Propagation path loss from radioterminal: uplink, other satellite (unknown parameter).

V: Adjustment to uplink path-loss to own satellite to obtain path-loss to other satellite (based on propagation path geometries to the two satellites, known a priori).

$P_{MRx}$: Radioterminal receive power in ATC mode (variable power, known to the mobile terminal and reported to the ATC network control center as part of conventional power control procedure).

$P_{MTx}$: Radioterminal transmit power in ATC mode (variable parameter, known to the ATC network control center as a byproduct of the uplink power control process).

$G_M$: Radioterminal antenna gain known a priori on an ensemble average basis, averaged for all or some directions and assumed identical for uplink and downlink.

$G_{UL\_os\_sbn}$: Satellite antenna gain: uplink, own satellite, spot-beam #n.

$G_{UL\_vs\_sbm}$: Satellite antenna gain: uplink, other satellite, spot-beam #m.

$P_{int\_os}$: Uplink ATC Interference to Own Satellite at Spot-beam #n.

$P_{int\_vs}$: Uplink ATC Interference to Other Satellite at Spot-beam #m.

Based on the above definitions, the following relations hold:

$$P_{int\_os} = P_{MTx} + G_M - L_{UL\_os} + G_{UL\_os\_sbn}; \text{ where } L_{UL\_os} \geq 0 \text{ dB} \quad (1.1)$$

$$L_{UL\_os} = L_{DL\_os} + F_{os} \quad (1.2)$$

$$L_{DL\_os} = P_B + G_{DL\_os} - G_M - P_{MRx} \quad (1.3)$$

Combining the above equations (1.1)-(1.3) yields the following equation:

$$P_{int\_os} = P_{MTx} - (P_B + G_{DL\_os}) + P_{MRx} - F_{os} + G_{UL\_os\_sbn} \quad (1)$$

Similarly, for any other satellite, the following relations hold:

$$P_{int\_vs} = P_{MTx} + G_M - L_{UL\_vs} + G_{UL\_vs\_sbm} \quad (2.1)$$

$$L_{UL\_vs} = L_{UL\_os} + V \quad (2.2)$$

$$L_{UL\_os} = L_{DL\_os} + F_{os} \quad (2.3)$$

$$L_{DL\_os} = P_B + G_{DL\_os} - G_M - P_{MRx} \quad (2.4)$$

Combining the above equations (2.1)-(2.4) yields the following equation:

$$P_{int\_vs} = P_{MTx} - (P_B + G_{DL\_os}) + P_{MRx} - F_{os} - V + G_{UL\_vs\_sbm} \quad (2)$$

In equations (1) and (2), all parameters on the right hand sides are either known a priori or available to the network control center in real time, or nearly real time.

Figure 5:
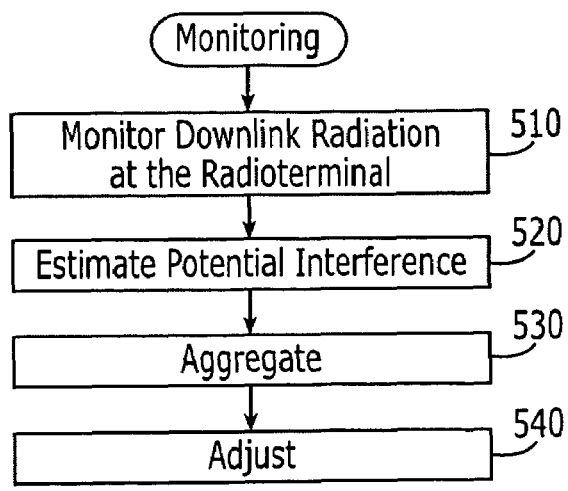
FIG. 5 is a flowchart of operations that may be performed for monitoring interference in a satellite communications system according to various embodiments of the present invention.

Hence, as shown in FIG. 5, according to some embodiments of the present invention, it is possible to estimate the potential uplink interference power (Block 520) to the system's own and/or other satellites at any desired spot-beam from each ATC active radioterminal (Block 510) and hence, from the ensemble of ATC active radioterminals. The interference power contribution of each radioterminal, for each uplink channel, may be aggregated (Block 530). This can provide a metric of the network-wide, aggregate, co-channel interference power on a per channel and/or per carrier basis, which can be applicable toward verifying that regulatory interference requirements are being met by the ATN, and/or used to adjust the radiation by the ATN and/or the radioterminals (Block 540), as was described in the above-cited published U.S. patent application.

Handover With Monitoring

Figure 4:
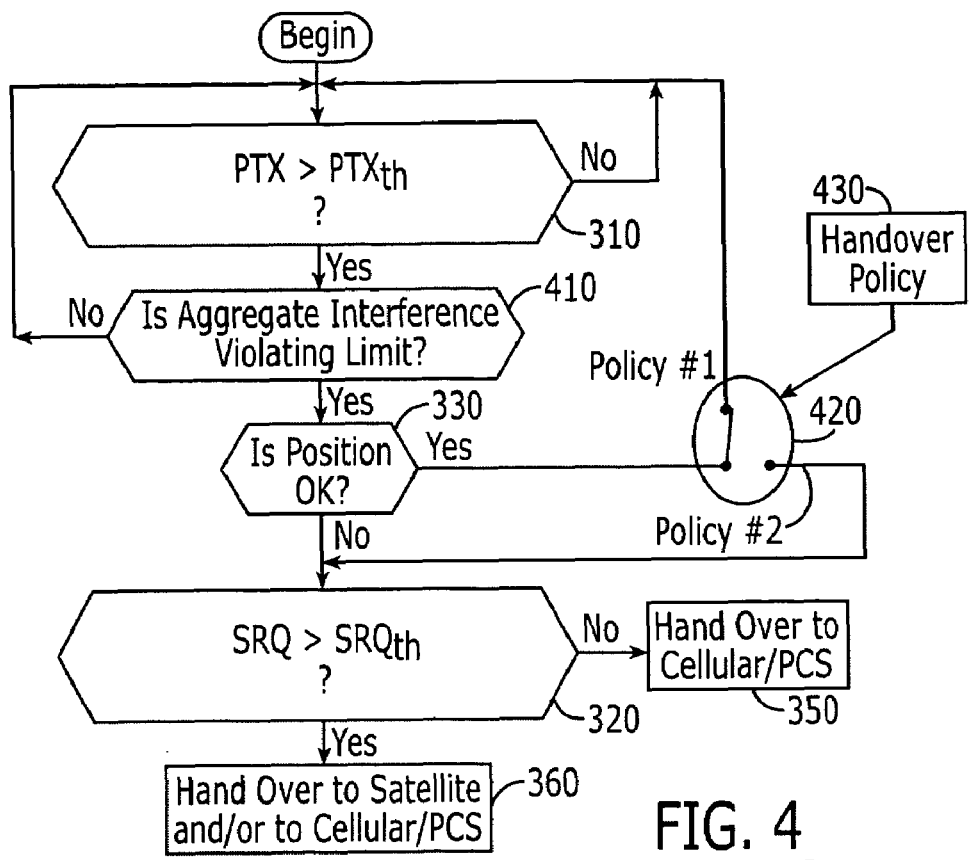
FIG. 4 is a flowchart of operations that may be performed to provide handover along with interference monitoring according to various embodiments of the present invention.

FIG. 4 illustrates a handover operation that takes into account monitoring of the aggregate ATC interference, according to some embodiments of the invention. These operations may be performed by a controller such as the controller 150 of FIG. 1, which may be part of the satellite, ATC, cellular and/or PCS systems, or at least partially independent therefrom. It will be understood by those having skill in the art that monitoring techniques that were described in the above-cited published U.S. patent application Publication 2003/0073436 A1 may be used, in addition to or instead of the monitoring techniques that were described in the immediately preceding section, and/or any other monitoring techniques.

In particular, referring to FIG. 4, a test is first made at Block 310 as to whether the radioterminal's transmit power is greater than a threshold, as was described in connection with FIG. 3. If Yes, then at Block 410, a test is made as to whether the aggregate interference is violating a limit using, for example, the monitoring techniques that were described above and/or the techniques that were described in the above-cited published U.S. patent application Publication 2003/0073436 A1. If the aggregate interference is violating a limit, then at Block 330, a test is made as to whether the radioterminal's position is OK, as was described in connection with Block 330 and/or 340 of FIG. 3.

Thus, when a power control function requests a radioterminal's transmit power above a level, $PTX_{th}$ (Block 310), which may correspond to the nominal transmit power level of the radioterminal in outdoor (no blockage) conditions, determinations are made about: (A) whether the aggregate interference limit is exceeded (Block 410), and (B) whether the radioterminal is inside the ATC coverage area (Block 330).

Handover to an alternate service (cellular/PCS and/or satellite) may take place in accordance with at least two alternative handover policies 430, selectable at 420. The selection of handover policy may be made by a network operations center based on regulatory rules or other criteria, as described below using Boolean notation:

Policy #1: IF the aggregate interference limit is exceeded AND the radioterminal is not inside the ATC coverage area, THEN hand over to an alternate service.

Policy #2: IF the aggregate interference level is exceeded, THEN hand over to an alternate service, regardless of the location of the radioterminal.

Policy #1 prioritizes the handover of radioterminals that are outside the ATC coverage area over those that are inside the ATC coverage area in order to reduce or prevent potential violation of the aggregate interference limit. Policy #2 treats all radioterminals equally, regardless of their position, once the aggregate interference limit is exceeded.

Referring again to FIG. 4, handover to another system proceeds based on the test at Block 320 as was previously described. More particularly, if the received satellite signal quality measure is greater than a threshold, then transfer may be performed to either the satellite and/or the cellular/PCS service at Block 360. If this received satellite signal quality is below the threshold, then transfer is made to the cellular/PCS system at Block 350.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for handing over wireless communications from an ancillary terrestrial component that is configured to wirelessly communicate with radioterminals using frequencies of a satellite frequency band, the method comprising:
   handing over wireless communications with a radioterminal from the ancillary terrestrial component that is configured to wirelessly communicate with radioterminals using frequencies of a satellite frequency band to a satellite that is configured to wirelessly communicate with the radioterminals using frequencies of a satellite frequency band and/or to a cellular/PCS system that is configured to wirelessly communicate with the radioterminals using cellular/PCS frequencies, responsive to a measure of position of the radioterminal.

2. A method according to claim 1 wherein the measure of the position of the radioterminal is obtained using GPS and/or non-GPS techniques.

3. A method according to claim 2 wherein the measure of the position of the radioterminal is obtained by the radioterminal using GPS and/or non-GPS techniques.

4. A system for handing over wireless communications from an ancillary terrestrial component that is configured to wirelessly communicate with radioterminals using frequencies of a satellite frequency band, the system comprising:
   a controller that is configured to hand over wireless communications with a radioterminal from the ancillary terrestrial component that is configured to wirelessly communicate with radioterminals using frequencies of a satellite frequency band to a satellite that is configured to wirelessly communicate with the radioterminals using frequencies of a satellite frequency band and/or to a cellular/PCS system that is configured to wirelessly communicate with the radioterminals using cellular/PCS frequencies, responsive to a measure of position of the radioterminal.

5. A system according to claim 4 wherein the measure of the position of the radioterminal comprises a GPS and/or a non-GPS measure.

6. A system according to claim 5 wherein the measure of the position of the radioterminal is obtained by the radioterminal using GPS and/or non-GPS techniques.

7. A wireless communications system comprising:
   an ancillary terrestrial component that is configured to wirelessly communicate with radioterminals using frequencies of a satellite frequency band;
   a satellite that is configured to wirelessly communicate with the radioterminals using frequencies of a satellite frequency band and/or a cellular/PCS system that is configured to wirelessly communicate with the radioterminals using cellular/PCS frequencies; and
   a controller that is configured to hand over wireless communications with a radioterminal from the ancillary terrestrial component to the satellite and/or to the cellular/PCS system, responsive to a measure of position of the radioterminal.

8. A system according to claim 7 wherein the measure of the position of the radioterminal comprises a GPS and/or a non-GPS measure.

9. A system according to claim 8 wherein the measure of the position of the radioterminal is obtained by the radioterminal using GPS and/or non-GPS techniques.

10. An ancillary terrestrial component comprising:
    an ancillary terrestrial component communication system that is configured to wirelessly communicate with radioterminals using frequencies of a satellite frequency band; and
    a controller that is configured to support hand over of wireless communications with a radioterminal from the ancillary terrestrial component to a satellite that is configured to wirelessly communicate with the radioterminals using frequencies of a satellite frequency band and/or to a cellular/PCS system that is configured to wirelessly communicate with the radioterminals using cellular/PCS frequencies responsive to a measure of position of the radioterminal.

11. A system according to claim 10 wherein the measure of the position of the radioterminal comprises a GPS and/or a non-GPS measure.

12. A system according to claim 11 wherein the measure of the position of the radioterminal is obtained by the controller from the radioterminal.

13. A satellite communications system comprising:
    a satellite that is configured to wirelessly communicate with radioterminals using frequencies of a satellite frequency band; and
    a controller that is configured to support hand over of wireless communications with a radioterminal from an ancillary terrestrial component that is configured to wirelessly communicate with the radioterminals using frequencies of the satellite frequency band to the satellite responsive to a measure of position of the radioterminal.

14. A system according to claim 13 wherein the measure of the position of the radioterminal comprises a GPS and/or a non-GPS measure.

15. A system according to claim 14 wherein the measure of the position of the radioterminal is obtained by the controller from the radioterminal.

16. A cellular/PCS communications system comprising:
    a cellular/PCS base station that is configured to wirelessly communicate with radioterminals using cellular/PCS frequencies; and
    a controller that is configured to support hand over of wireless communications with a radioterminal from an ancillary terrestrial component that is configured to wirelessly communicate with the radioterminals using frequencies of the satellite frequency band to the cellular/PCS base station responsive to a measure of position of the radioterminal.

17. A system according to claim 16 wherein the measure of the position of the radioterminal comprises a GPS and/or a non-GPS measure.

18. A system according to claim 17 wherein the measure of the position of the radioterminal is obtained by the controller from the radioterminal.

19. A radioterminal comprising:
    a radioterminal communication system that is configured to wirelessly communicate with an ancillary terrestrial component using frequencies of a satellite frequency band; and
    a controller that is configured to support hand over of wireless communications between the radioterminal and the ancillary terrestrial component from the ancillary terrestrial component to a satellite that is configured to wirelessly communicate with the radioterminal using frequencies of a satellite frequency band and/or to a cellular/PCS system that is configured to wirelessly communicate with the radioterminal using cellular/PCS frequencies responsive to a measure of position of the radioterminal.

20. A radioterminal according to claim 19 further comprising a radioterminal position measurement system, and wherein the controller is responsive to the radioterminal position measurement system.

21. A radioterminal according to claim 20 wherein the radioterminal position measurement system comprises a GPS and/or non-GPS radioterminal measurement system.

22. A radioterminal communications handover method comprising:
  handing over radioterminal communications among an ancillary terrestrial component that is configured to wirelessly communicate with radioterminals using frequencies of a satellite frequency band, a satellite that is configured to wirelessly communicate with the radioterminals using frequencies of a satellite frequency band and/or a cellular/PCS system that is configured to wirelessly communicate with the radioterminals using cellular/PCS frequencies, responsive to a measure of position of the radioterminal.

23. A method according to claim 22 wherein the measure of the position of the radioterminal is obtained using GPS and/or non-GPS techniques.

24. A method according to claim 23 wherein the measure of the position of the radioterminal is obtained by the radioterminal using GPS and/or non-GPS techniques.

25. A system for handing over radioterminal communications comprising:
  a controller that is configured to hand over radioterminal communications among an ancillary terrestrial component that is configured to wirelessly communicate with radioterminals using frequencies of a satellite frequency band, a satellite that is configured to wirelessly communicate with the radioterminals using frequencies of a satellite frequency band and/or a cellular/PCS system that is configured to wirelessly communicate with the radioterminals using cellular/PCS frequencies, responsive to a measure of position of the radioterminal.

26. A system according to claim 25 wherein the measure of the position of the radioterminal comprises a GPS and/or a non-GPS measure.

27. A system according to claim 26 wherein the measure of the position of the radioterminal is obtained by the radioterminal using GPS and/or non-GPS techniques.

28. A radioterminal communications handover method comprising:
  handing over radioterminal communications between a terrestrial wireless component and a satellite responsive to a measure of position of the radioterminal.

29. A method according to claim 28 wherein the measure of the position of the radioterminal is obtained using GPS and/or non-GPS techniques.

30. A method according to claim 29 wherein the measure of the position of the radioterminal is obtained by the radioterminal using GPS and/or non-GPS techniques.

31. A system for handing over radioterminal communications comprising:
  a controller that is configured to hand over radioterminal communications between a terrestrial component and a satellite, responsive to a measure of position of the radioterminal.

32. A system according to claim 31 wherein the measure of the position of the radioterminal comprises a GPS and/or a non-GPS measure.

33. A system according to claim 32 wherein the measure of the position of the radioterminal is obtained by the radioterminal using GPS and/or non-GPS techniques.

* * * * *

UNITED STATES PATENT AND TRADEMARK OFFICE
CERTIFICATE OF CORRECTION

PATENT NO. : 7,418,263 B2
APPLICATION NO. : 11/095007
DATED : August 26, 2008
INVENTOR(S) : Dutta et al.

It is certified that error appears in the above-identified patent and that said Letters Patent is hereby corrected as shown below:

On the Title Page
Item 56, U.S. Patent Documents page 2:
    Please delete: "6,260,994 B1 7/2001 Matsumoto et al."
    Please insert: -- 6,201,967 B1 3/2001 Goerke --
    Please insert: -- 6,160,994     12/2001 Wiedeman --

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,418,263 B2  Page 1 of 1
APPLICATION NO. : 11/095007
DATED : August 26, 2008
INVENTOR(S) : Dutta et al.

It is certified that error appears in the above-identified patent and that said Letters Patent is hereby corrected as shown below:

On the Title Page
Item 56, U.S. Patent Documents page 2:
    Please delete: "6,260,994 B1 7/2001 Matsumoto et al."
    Please insert: -- 6,201,967 B1 3/2001 Goerke --
    Please insert: -- 6,160,994     12/2000 Wiedeman --

This certificate supersedes the Certificate of Correction issued November 4, 2008.

Signed and Sealed this

Twenty-third Day of December, 2008

JON W. DUDAS
*Director of the United States Patent and Trademark Office*